W. H. PAUL.
RATE DIVISION CALCULATOR.
APPLICATION FILED APR. 18, 1916.
1,234,933.
Patented July 31, 1917.
3 SHEETS—SHEET 1.
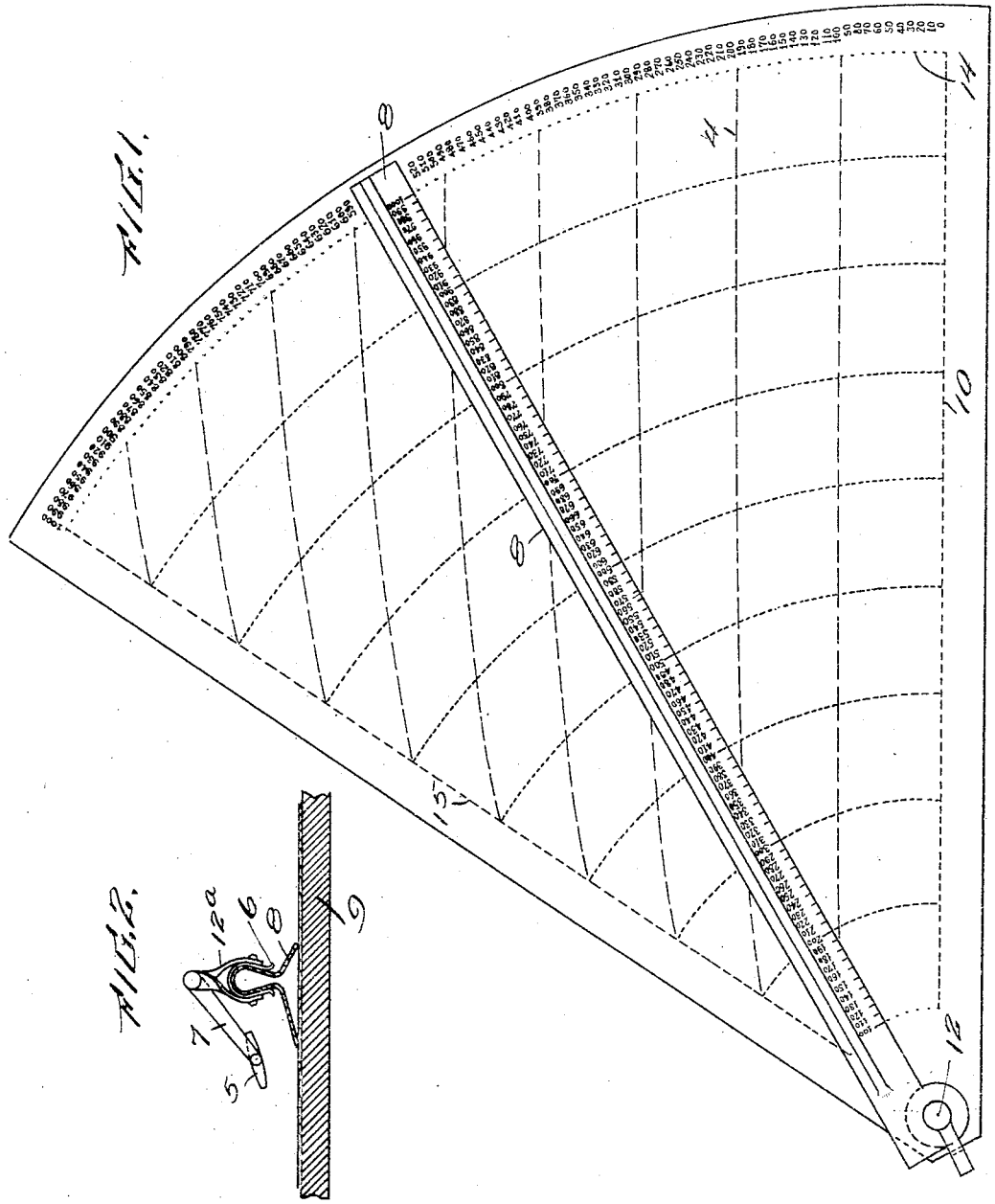
Witness
Carney Hartley
Inventor
W. H. Paul.
By Mason Fenwick Lawrence,
Attorneys

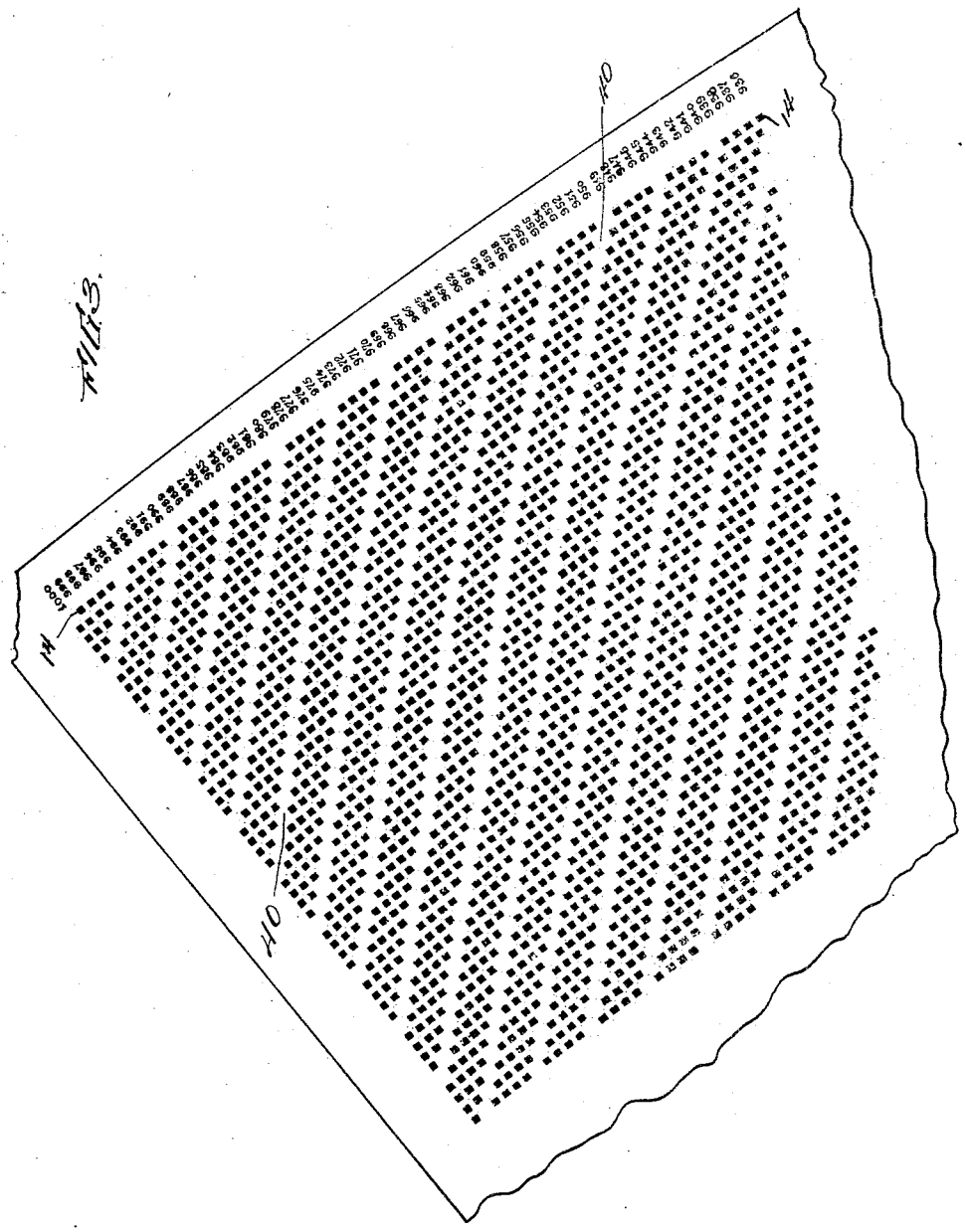

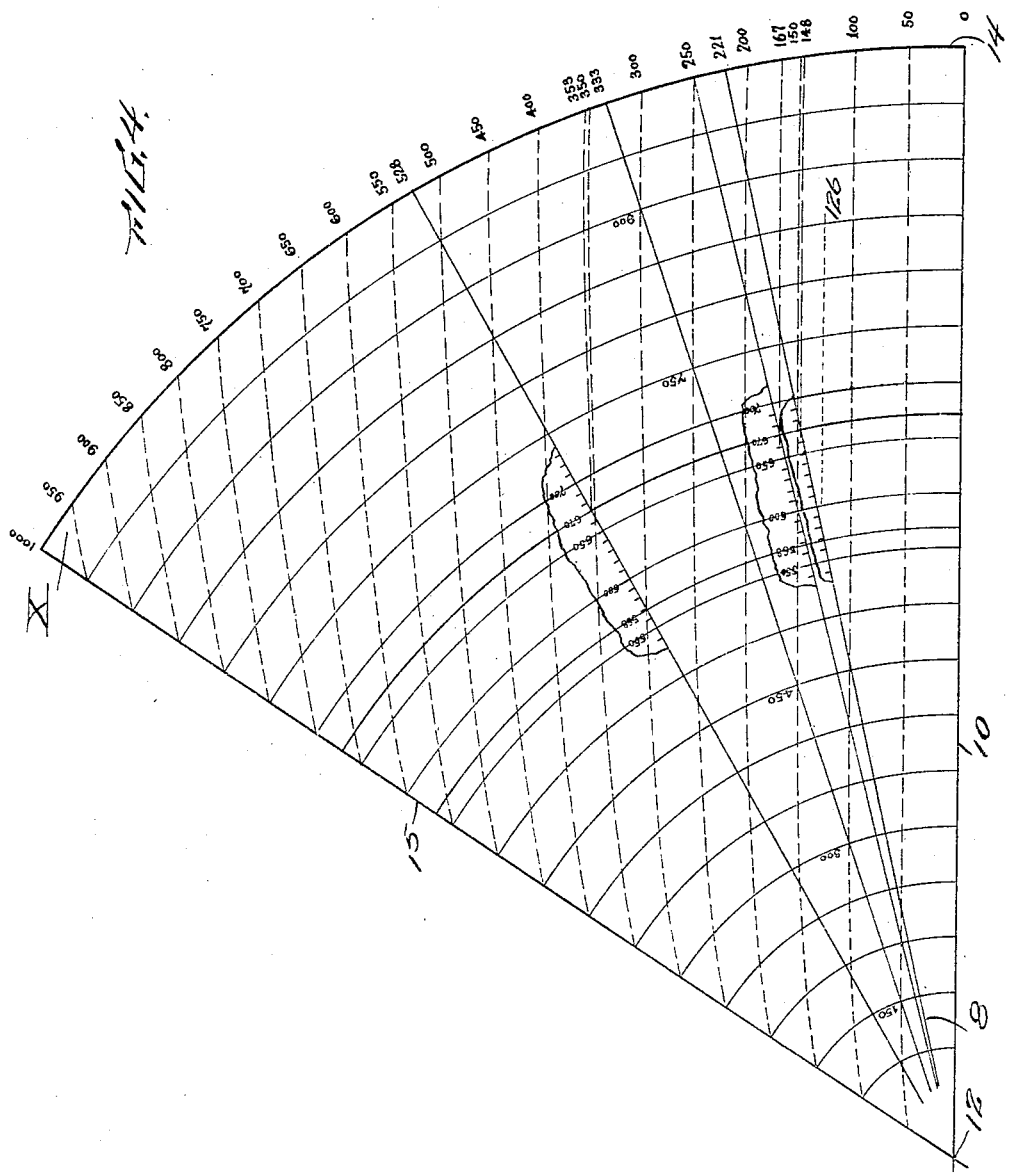

UNITED STATES PATENT OFFICE.

WILLIAM HAYES PAUL, OF DENVER, COLORADO.

RATE-DIVISION CALCULATOR.

1,234,933.

Specification of Letters Patent.

Patented July 31, 1917.

Application filed April 18, 1916. Serial No. 92,001.

*To all whom it may concern:*

Be it known that I, WILLIAM HAYES PAUL, a citizen of the United States, residing at Denver, in the county of Denver and State of Colorado, have invented certain new and useful Improvements in Rate-Division Calculators; and I do hereby declare the following to be a full, clear, and exact description of the invention, such as will enable others skilled in the art to which it appertains to make and use the same.

This invention relates to rate division calculators, the object being to provide novel means for readily ascertaining the division of rates between railroads jointly hauling freight and readily solving other and similar problems.

In the accompanying drawings forming a part of this application Figure 1 is a diagram of the plan of the chart. Fig. 2 is a cross section of a portion of the mounted chart and a suitable form of movable arm with a magnifying glass attached by means of a small clamp or the like. Fig. 3 is a detailed view, greatly enlarged, of the upper corner X on Fig. 4 of the chart showing the concentric dotted lines with every fifth dot omitted. Fig. 4 is a diagram of a plan view showing how a given example is worked out.

In the construction of the device I employ a chart having the form of a segment of a circle the radius 10 of which may be any suitable length. From the point 12 as a center an arc 14, preferably of the same length as radius 10, is struck. The arc 14 and the radius 10 are to be divided into the same number of subdivisions. Those along the radius 10 are equal to each other and those along the arc 14 are equal to each other. Preferably the radius and arc are of equal length and each divided into one thousand equal parts, and the description will be based upon and in accordance with this preferable construction.

It will be noted that the length and number of dots making up certain of the lines in Fig. 1 have no relation to the subdivisions above referred to. In this figure the lines are dotted because they are merely diagrammatic. Note also that on account of lack of space, only every tenth subdivision of the arc 14 is shown, and likewise only every tenth subdivision of the scale on the swinging arm or indicator 8 hereafter described.

The space bounded by arc 14, radius 10 and radius 15, located in the manner hereafter described, is filled with dots arranged on arcs concentric with arc 14, said arcs corresponding in number to and passing through the subdivision points in radius 10 and the distance along the arcs between the centers of adjacent dots being equal to the length of the subdivisions in arc 14.

For convenience in operation it is desirable to omit dots at regular intervals, preferably every fifth dot in each arc, so as to leave blank spaces or lines such as 40 in Fig. 3 and as partially indicated by diagrammatic lines 4 in Fig. 1. The blank spaces or lines 40 and the lines of dots running in the same general direction, all as shown in greatly enlarged detail at Fig. 3, will be called the transverse series of lines. By comparison of Fig. 3 and portion X of Fig. 4 it will be evident that in practice the dots and the lines formed thereby will be so fine and so close as to make the locating or following of any particular line extremely difficult unless some indicating or dividing means be provided. For this reason the dots are omitted forming blank lines 40 as above described, so that every fifth transverse line will be a blank line, thus making the locating and following of any particular line comparatively easy.

As the number of divisions in arc 14 is the same as the number of divisions of radius 10 so the number of dots in each arc (including the dots omitted for convenience as above indicated) will be the same as the number of divisions in that portion of radius 10 between such arc and the center 12.

It will be obvious that the centers of terminal dots of the arcs, at their upper ends, will be in a straight line running from the center 12 to the terminus of arc 14 and this line is indicated at 15 in Fig. 1.

It will also be obvious that the number of dots in the arcs decreases as the center 12 is approached. Thus arc 14 has 1,000 dots (counting the spaces left by the omitted dots), the next has 999 and the next 998 and so on.

Pivoted at center 12 I provide a swinging arm or indicator 8 having a scale along its radial edge corresponding to the divisions of radius 10 as clearly shown at Fig. 1. For convenience the arm 8 may be of shape indicated at Fig. 2 and be provided with a slidable clamp 6 carrying hingedly mounted arm 7 which, in turn, carries magnifying glass 5 for reading the chart with exactness at any point along the indicator.

Any suitable means as clamp 12ª, of any usual construction, may be provided for adjusting the friction on arm 8 and for maintaining the scaled edge in radial position.

It will be apparent that the transverse lines start from arc 14 and are numbered the same as the divisions of that arc.

The following is an example of the operation of my invention as illustrated at Fig. 4. In a total haul of 568 miles, with a through rate of $6.70, three railroads may be concerned, the length of the hauls being 126 miles, 142 miles, and 300 miles respectively. It is desired to ascertain what amount the road hauling the shipment 126 miles should receive. Move arm 8 until its scaled edge at point 568 intersects line 126 of the transverse series. Then ascertain which of the lines of the transverse series intersects the scaled edge at arc 670, when in this position, and follow this transverse line to arc 14 where it will be found to terminate at division 148 and $1.48 will be the rate for the road carrying the shipment 126 miles. Similarly, to ascertain the part of the rate going to the road making the 300 mile haul, move the arm 8 until its scaled edge at point 568 intersects the transverse line 300. Then find the transverse line which intersects point 670 on the arm in this position and follow this transverse line to arc 14 where it will be found to terminate at division 353 so that $3.53 will be the amount due the road making the 300 mile haul.

Suppose a through rate of $6.00 per hundred and one of the participating roads is to receive 33⅓% of the through rate (it being remembered that rates are not always apportioned on mileage basis). Set arm 8 at 333 on arc 14. Follow scaled edge to its intersection with arc 600. Find the transverse line passing through that intersection and follow it to arc 14 where it will terminate at division 200 so that the portion of the $6.00 rate due said road will be $2.00.

The principle is well understood, but emphasis is laid upon the manner of plotting the chart or scale as above set forth. A chart constructed in this manner can be used to multiply and divide and to do all the operations of percentage and proportion in which these two basic operations are employed. The decimal point need not be considered as the numbers are read merely as characters, so that in the multiplication of a single number by a single number the operation is the same as for a number one hundred times as large.

It will be noted that the lines on Fig. 4 are merely diagrammatic and illustrative and in practice would not actually appear in form here shown.

It will be apparent that the exact construction of the arm 8 and its associated parts is immaterial and no part of the present invention. Also that the chart need not be on a plane surface as here shown but may be made in other shapes, as, for example, cone shaped.

It will be understood that Fig. 3 represents the dots greatly enlarged and that in practice they will appear merely as dots similar to the dots making up any photographic process print. On enlargement such dots appear as quadrilaterals. So here the dots are represented in the enlargement as quadrilaterals but the shape of the dots is optional and is no part of the present invention.

It will be noted that a portion of the chart immediately adjoining center 12 and preferably extending to the 100th arc, may be left blank because the transverse lines within this area run so nearly parallel with the indicator that the exact point of intersection may be difficult to ascertain, whereas any problem involving the figures of 100 or less may be worked with more exactness on the other portion of the chart by taking the figure 1000 as the basis instead of 100 and by moving the decimal point accordingly.

It is understood that the arrangement of the dots in the concentric arcs may be variously changed within the principle of the present invention, and that in instances where problems involving numbers lower than the maximum number of the scale or chart are to be performed that suitable sets of the concentric arcs or groups of the arcs may be omitted and that certain ones of them may be retained so as to facilitate the reading along the spaced lines toward the marginal scale.

I claim:

1. In a device of the class described, a chart having dots arranged in concentric arcs and equally spaced there-along and the arcs being all equally spaced apart, the radius of each arc of dots being divided into a number of divisions equal to the number of dot divisions in the arc.

2. In a device of the class described, a chart having dots arranged in concentric arcs and spaced there-along, a number scale at the outer arc, said spaces being equal except that dots are omitted at regular intervals for leaving lines of spaces extending transversely of the arcs leading to the number scale at the outer arc.

3. In a device of the class described, a chart having dots arranged in concentric arcs and spaced there-along, a marginal scale for the outer arc, said spaces being equal except that dots are omitted at regular intervals for leaving lines of spaces extending transversely of the arcs and leading to the marginal scale to facilitate finding the result of a problem on said scale, the number of dots plus spaces left by omitted dots in each arc being equal to the number of divisions in respective radii.

4. In a device of the class described, a chart having dots arranged in concentric arcs and equally spaced there-along and the arcs being all equally spaced apart, a scale for the marginal arc and an arm pivoted at the center and having a scale corresponding to the arcs and indicia leading transversely across the arcs to the scale.

5. In a device of the class described, a chart having dots arranged in concentric arcs and equally spaced there-along, said arcs being equally spaced apart and each arc having a number of dots equal to the number of divisions in respective radii, an arm pivoted at the center and having a scale corresponding to the arcs and each arc and its respective radius being divided into an equal number of parts.

6. In a device of the class described, a chart having dots arranged in concentric arcs and spaced there-along, said spaces being equal except that dots are omitted at regular intervals for leaving lines of spaces extending transversely of the arcs, a marginal scale to which said lines lead and an arm pivoted at the center and having a scale corresponding to the arcs.

7. In a device of the class described, a chart having dots arranged in concentric arcs and spaced there-along, said spaces being equal except that dots are omitted at regular intervals for leaving lines of spaces extending transversely of the arcs and leading to the marginal arc, the number of dots plus spaces left by omitted dots in each arc being equal to the number of divisions in respective radii and an arm pivoted at the center and having a scale corresponding to the arcs, and a scale for the marginal arc upon which the result of a given problem is found by relative position of the arm to any given point on the chart.

8. In a device of the class described, a chart including a series of concentric arcs having divisional points represented by dots equally spaced for given distances, certain of the dots being omitted at regular intervals leaving lines of blank spaces extending transversely of the arcs, the blank spaces dividing a plurality of arcs proportionally, and constituting a guide for facilitating reading from the inner portion of the chart toward the outer arc, the divisional points of the arcs and the lines of spaces being designated by a scale of numbers adjacent the outer arc, and an arm having a scale of numbers equal to the first named scale corresponding with the arcs and pivoted at the center from which said arcs are struck.

9. In a device of the class described, a chart including a series of concentric arcs equally spaced and having divisional points represented by dots equally spaced for given distances, certain of the dots being omitted at regular intervals, leaving lines of blank spaces extending transversely of the arcs, the blank spaces dividing a plurality of arcs proportionally, each arc being divided into equal parts, the number of which is greater than in the preceding arc, and an arm having a scale coincident with the arcs and pivoted at the center from which the arcs are struck.

10. In a device of the class described, a chart having a field of dots disposed in concentric arcs, the number of dots in the outer arc equaling the numerical divisions of its radius, a scale for the divisions in the outer arc, an indicator pivoted at the center of the arcs and having a scale indicating the number of the respective arcs, the field of dots being divided by linear spaces formed by omitting dots in regular sequence along each arc, the spaces extending from one radius to the outer arc and terminating at points of the arc and radius of equal numerical value, the space lines affording paths to be followed when reading from a given point on the arc scale to a given setting of the indicator and from a point on this outwardly again to the arc scale in solving a problem.

In testimony whereof I affix my signature in presence of two witnesses.

WILLIAM HAYES PAUL.

Witnesses:
ALBERT L. VOGL,
CASH WHITEHEAD.

Copies of this patent may be obtained for five cents each, by addressing the "Commissioner of Patents, Washington, D. C."